United States Patent Office 3,557,081
Patented Jan. 19, 1971

3,557,081
ALKALI METAL SALTS OF GUANOSINE
Yoshihisa Suzuki, Kawasaki-shi, Takeshi Tsukada, Yokohama-shi, Tsuneo Hirahara, Tokyo, and Tadashi Nakamura, Fujisawa-shi, Japan, assignors to Ajinomoto Co., Inc., Tokyo, Japan
No Drawing. Filed Oct. 7, 1968, Ser. No. 765,632
Claims priority, application Japan, Oct. 7, 1967, 42/64,536
Int. Cl. C07d 51/54
U.S. Cl. 260—211.5                         11 Claims

ABSTRACT OF THE DISCLOSURE

The sodium, potassium and lithium salts of guanosine are obtained in crystalline form when guanosine is reacted with the corresponding alkali metal hydroxide or carbonate in aqueous solution, and the solution is supersaturated with the alkali metal salt formed. The alkali metal salts are readily decomposed by means of acid, and purified guanosine may be crystallized from the neutralized acid solution.

This invention relates to novel alkali metal salts of guanosine, to a method of preparing the same, and to the purification of crude guanosine by conversion to its crystalline alkali metal salt and by decomposition of the salt.

Guanosine is an intermediate in the preparation of 5'-guanylic acid whose sodium salt is a known flavor intensifier for food, and of other guanine derivatives. Guanosine can be prepared in crude form by fusing guanine derivatives with ribose derivatives, by reacting 4-amino-5-imidazole carboxamide riboside with a ring-closing agent, by microbial fermentation, or by hydrolysis of ribonucleic acids.

Depending on the method of preparation, the crude guanosine may be contaminated with other nucleosides, purine or pyrimidine bases, protein, amorphous organic materials, or pigments. The known methods of purifying guanosine have not been entirely satisfactory when employed on a industrial scale. It has been virtually impossible heretofore to remove guanine present as a contaminant from guanosine.

We now have found that guanosine forms alkali metal salts which are much less soluable in water than the corresponding guanine salts, and are readily crystallized from their aqueous solutions in a state of high purity. Contaminants other than guanine are simultaneously removed by the crystallization process. The pure alkali metal salts are decomposed by acid, and pure crystalline guanosine is recovered from the decomposition mixture.

The alkali metal salts are formed when guanosine is reacted in an aqueous medium with at least equimolecular amounts of an alkali metal hydroxide or alkali metal carbonate. The lithium, sodium and potassium salts are formed in this manner. The cesium and rubidium salts lack economical value. The bicarbonates are not effective, nor are the corresponding ammonium compounds.

When guanosine is combined in an aqueous medium with less than an equimolecular amount of an alkali metal hydroxide or carbonate, alkali metal guanosinate crystals cannot be recovered.

The composition of the obtained guanosinate crystals depends on the conditions prevailing during formation and crystallization. If the alkali metal hydroxide or carbonate is present in the reaction mixture in equimolecular amounts or in an excess of less than 100%, the salt contains one alkali metal atom per guanosine unit. More than 100% excess of sodium metal hydroxide in the reaction mixture results in the formation of disodium, guanosinates. No excess of carbonate can produce the last mentioned salts, and salts containing one atom of alkali metal per guanosine radical are obtained even with a large excess of carbonate.

The nature of the aqueous reaction medium is not critical. Pure water may be employed but neutral salts or water soluble organic solvents may be present. The reaction proceeds at any temperature at which the aqueous medium is liquid. The alkali metal salts are crystallized when the medium is made supersaturated with the salts.

It is preferred to perform the reaction between the alkali metal hydroxide or carbonate and guanosine at fairly high temperature, typically 80° C., and then to cool the formed solution to induce crystallization of the salt. Obviously, the salts may also be caused to crystallize by evaporating a portion of the water from the solution, by adding an organic solvent miscible with water in which the alkali metal salt is less soluble than in water or insoluble, by salting out with corresponding neutral alkali metal salts and the like, as is well known in the art.

The formed crystals may contain different amounts of water of crystallization if precipitated under different conditions, and the following Table I lists identifying physical properties of typical alkali metal guanosinates of the invention. In the table, GR stands for the guanosine radical combined with one or two atoms of alkali metal in the salt.

TABLE I

| Salt | M.P., °C. | X-ray diffraction pattern (*) |
|---|---|---|
| GR.Na.2H$_2$O, ($\alpha$-form) | 190 (sint.), 213 (dec.) | 8.3, 14.6, 15.0, 18.7, 20.5, 21.6, 22.4, 23.3, 26.4 |
| GR.Na.2.5H$_2$O, ($\beta$-form) | 184 (sint.), 191 (dec.) | 12.6, 15.9, 17.1, 17.5, 19.6, 20.0, 23.0, 23.4, 24.5, 25.9 |
| GR.2Na.7H$_2$O | 81 (sintl), 85 (m.) | 5.9, 11.9, 12.4, 14.3, 16.2, 17.4, 18.0, 23.0, 24.4, 25.9 |

* Peaks in X-ray powder diffraction pattern ($2\theta$) at angles of less than 30° (K$\alpha$ radiation of copper).

The dihydrate alpha-form of monosodium guanosinate is metastable at ordinary temperature in contact with water and readily converts to the stable 2.5-hydrate.

The crystals are separated from the mother liquor by conventional procedures such as filtration, centrifuging decanting, or the like. The crystals are so large as to be filtered easily, and adhering mother liquor can be removed by washing with small amounts of cold water or other suitable solvents, as is conventional.

The recovered pure crystals are readily decomposed by such acids as hydrochloric, sulfuric or acetic acid, or by contact with cationic ion-exchange resins in the H-form. When the acid solutions so obtained are neutralized, pure guanosine can be recovered in a known manner. The yield of pure guanosine in terms of the initial, contaminated guanosine is high.

The following examples are further illustrative of the invention.

EXAMPLE 1

20 g. guanosine contaminated with 0.3 g. guanine were dissolved in 50 ml. 2 N sodium hydroxide solution at 65° C., the molar ratio of sodium hydroxide to guanosine in the resulting solution being 1.5:1. The hot aqueous solution was filtered to remove insoluble impurities, and the filtrate was gradually cooled to 25° C. while being stirred slowly. A first crystal crop was recovered by filtration, and the filtrate was further cooled to 5° C. with rapid agitation and stored in an icebox overnight. A second lot of crystals was recovered, washed on the filter with methanol and dried. Each lot weighed 6 g.

The crystals of the first lot started sintering at 190 C. and decomposed at 213° C. Those of the second lot sintered at 184° C. and decomposed at 190° C. when quickly heated.

Both lots were analyzed for guanosine content by ultraviolet absorption, for sodium by acid titration, for nitrogen by the Kjeldahl method, and for water by Karl Fischer reagent. The results in percent are listed in Table II together with the corresponding values calculated for $GR \cdot Na \cdot 2H_2O$ and $GR \cdot Na \cdot 2.5H_2O$.

TABLE II

| | GR | Na | N | $H_2O$ |
|---|---|---|---|---|
| Calculated for $GR \cdot Na \cdot 2H_2O$ | 83.0 | 6.7 | 20.5 | 10.6 |
| Found (Lot 1) | 82.7 | 6.7 | 20.3 | 10.5 |
| Calculated for $GR \cdot Na \cdot 2.5H_2O$ | 80.9 | 6.6 | 20.0 | 12.9 |
| Found (Lot 2) | 82.5 | 6.3 | 20.5 | 12.8 |

The crystals of the two lots were identified by their X-ray diffraction patterns (see Table I) as α- and β-forms respectively. The crystals of the α-form are prismatic or granular, those of the β-form prismatic or flaky when examined by the naked eye or under the microscope.

3 g. crystals from each lot were added to respective 25 ml. batches of water, and enough 6 N hydrochloric acid was added to each batch to make the pH 6. The guanosine crystals precipitated thereby were recovered by filtration, washed, and dried. Each guanosine batch weighed 2 g. and was found to give a single spot on a paper chromatogram developed from a 200 microgram aliquot. No trace of guanine was detected.

EXAMPLE 2

10 g. crude guanosine of the same batch as in Example 1 were dissolved in 50 ml. 8 N sodium hydroxide solution at 65° C. The molar ratio of sodium hydroxide to guanosine in the solution was 11.3:1. The hot solution was filtered, and the filtrate was permitted to cool to 30° C. with stirring. The crystals formed were filtered off, washed with methanol, and dried. They weighed 4 g., sintered at 81° C., and melted at 85° C. They were prismatic or flaky when inspected by the naked eye or under a microscope. They were identified as

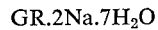

$GR \cdot 2Na \cdot 7H_2O$ by the methods described in Example 1.

Calculated (percent): GR, 62.5; Na, 10.2; N, 15.5; $H_2O$, 27.8. Found: GR, 62.7; Na, 10.7; N, 15.4; $H_2O$, 26.9.

When a mixture of 2 g. of the salt crystals with 20 ml. water was adjusted to pH 6 with 20 ml. 6 N hydrochloric acid, guanosine crystallized, and was found to be free from detectable amounts of guanine.

EXAMPLE 3

13 g. crude guanosine containing 0.13 g. guanine were dissolved in 30 ml. of 2 N lithium hydroxide solution at 80° C. The ratio of lithium hydroxide to guanosine was 1.3:1. The hot solution was filtered, cooled to 30° C. and stirred. The crystals thereby precipitated were filtered off, washed with methanol containing 1% lithium hydroxide, and dried. They weighed 4.6 g., sintered at 90° C. and melted at 110° C. They were found under the microscope to be slender needles or thin plates. They were identified as monolithium guanosinate pentahydrate by the methods described in Example 1.

Calculated (percent): GR, 74.7; Li, 1.83; N, 18.5; $H_2O$, 23.8. Found (percent): GR, 74.3; Li, 1.98; N, 18.3; $H_2O$, 23.5.

When 2 g. of these crystals were decomposed with hydrochloric acid as described above, 1.4 g. pure guanosine was recovered, and was found free of impurities detectable by paper chromatography.

EXAMPLE 4

15 g. crude guanosine of the same batch as employed in Example 3 were dissolved in 20 ml. 3.5 N potassium hydroxide solution at 50° C., a 30% excess of potassium hydroxide. The solution was filtered hot, and the filtrate was mixed with 80 ml. methanol and then kept at 50° C. in a closed vessel. The crystals formed were separated from the mother liquor by filtration, washed with a 2% solution of potassium hydroxide in methanol, and dried. They weighed 12 g. and melted at 170° C. They appeared flaky or prismatic to the naked eye and under the microscope. They were identified as monopotassium guanosinate dihydrate by analysis.

Calculated (percent): GR, 79.3; K, 10.9; N, 19.6; $H_2O$, 10.1. Found (percent): GR, 77.2; K, 10.8; N, 19.1; $H_2O$, 11.0.

7 g. pure guanosine were obtained in crystalline form from 10 g. of the crystals by decomposition with hydrochloric acid, as described above.

Analogous results were obtained, when the hydroxides referred to in Examples 1 and 4 were replaced by equimolecular amounts of the corresponding carbonates. Only the monosodium salt was obtained with sodium carbonate under the conditions of Example 2, and lithium carbonate is not sufficiently soluble in water to make its use practical under the conditions of Example 3.

What is claimed is:

1. A method of preparing an alkali metal salt of guanosine which comprises reacting guanosine with an alkali metal hydroxide or alkali metal carbonate in aqueous solution, the amount of said alkali metal hydroxide or alkali metal carbonate being at least one mole per mole of said guanosine, and recovering the alkali metal guanosinate so formed from the solution in crystalline form.

2. A method as set forth in claim 1, wherein said alkali metal is lithium, sodium, or potassium.

3. A method as set forth in claim 2, wherein said guanosine is reacted with the hydroxide of said alkali metal.

4. A method as set forth in claim 1, wherein said alkali metal is sodium or potassium, and said guanosine is reacted with the carbonate of said alkali metal.

5. A method of purifying crude guanosine which comprises:
   (a) reacting said crude guanosine with an alkali metal hydroxide or alkali metal carbonate in aqueous solution,
      (1) the amount of said alkali metal hydroxide or alkali metal carbonate being at least one mole per mole of said guanosine;
   (b) recovering the alkali metal guanosinate so formed from the resulting solution in crystalline form;
   (c) decomposing said alkali metal guanosinate in aqueous solution by reaction with an acid or a cation exchange resin in the H-form until guanosine is formed; and (d) recovering said guanosine in crystalline form.

6. An alkali metal guanosinate in crystalline form.

7. A guanosinate as set forth in claim 6, wherein said alkali metal is sodium.

8. A guanosinate as set forth in claim 7, wherein the ratio of sodium atoms to guanosine radicals is 1:1.

9. A guanosinate as set forth in claim 6, wherein the ratio of sodium atoms to guanosine radicals is 2:1.

10. A guanosinate as set forth in claim 6, wherein said alkali metal is potassium.

11. A guanosinate as set forth in claim 6, wherein said alkali metal is lithium.

References Cited
UNITED STATES PATENTS

| | | | |
|---|---|---|---|
| 3,190,877 | 6/1965 | Ishibashi et al. | 260—211.5 |
| 3,300,477 | 1/1967 | Jacob et al. | 260—211.5 |
| 3,374,223 | 3/1968 | Senoo et al. | 260—211.5 |
| 3,454,559 | 7/1969 | Yamazaki et al. | 260—211.5 |
| 3,457,254 | 7/1969 | Yano et al. | 260—211.5 |

LEWIS GOTTS, Primary Examiner

J. R. BROWN, Assistant Examiner